United States Patent [19]

Hosokawa et al.

[11] 4,335,690
[45] Jun. 22, 1982

[54] TEMPERATURE-DETECTION TYPE CHANGE-OVER VALVE

[75] Inventors: Hiroyuki Hosokawa, Oobu; Shiro Maeda, Kariya, both of Japan

[73] Assignee: Nippondenso Co., Ltd., Kariya, Japan

[21] Appl. No.: 135,150

[22] Filed: Mar. 28, 1980

[30] Foreign Application Priority Data

Apr. 3, 1979 [JP] Japan .................................. 54-40630

[51] Int. Cl.³ ............................................. G05D 23/12
[52] U.S. Cl. ..................................... 123/407; 236/86; 251/337
[58] Field of Search ................ 251/337; 123/588, 556, 123/552, 407; 236/86, 100

[56] References Cited

U.S. PATENT DOCUMENTS

| | | | |
|---|---|---|---|
| 2,638,925 | 5/1953 | Monahan | 251/337 X |
| 2,725,076 | 11/1955 | Hansen et al. | 251/337 X |
| 3,800,759 | 4/1974 | Cedar | 123/407 X |
| 3,841,551 | 10/1974 | Ota | 236/86 |
| 3,960,321 | 6/1976 | Steele, Jr. | 236/86 X |
| 4,036,433 | 7/1977 | Wagner et al. | 236/86 X |
| 4,142,675 | 3/1979 | Maltby | 236/86 |
| 4,244,343 | 1/1981 | Yamaguchi et al. | 123/552 X |

*Primary Examiner*—William E. Tapolcai, Jr.
*Attorney, Agent, or Firm*—Cushman, Darby & Cushman

[57] ABSTRACT

A temperature-detection type change-over valve for switching the state of communication between a plurality of passages, suitable for use in combination with a controller for controlling the operation of an internal combustion engine. The valve has a thermally expandable member adapted to expand when heated, a shaft adapted to be pressed and moved in one direction as the thermally expandable member expands, a valve movable following the movement of the shaft between a first and a second position for switching the state of communication of passages, and a tension spring disposed to surround the shaft and adapted to exert a biasing force to act against the force generated by the expansion of the thermally expandable member.

1 Claim, 3 Drawing Figures

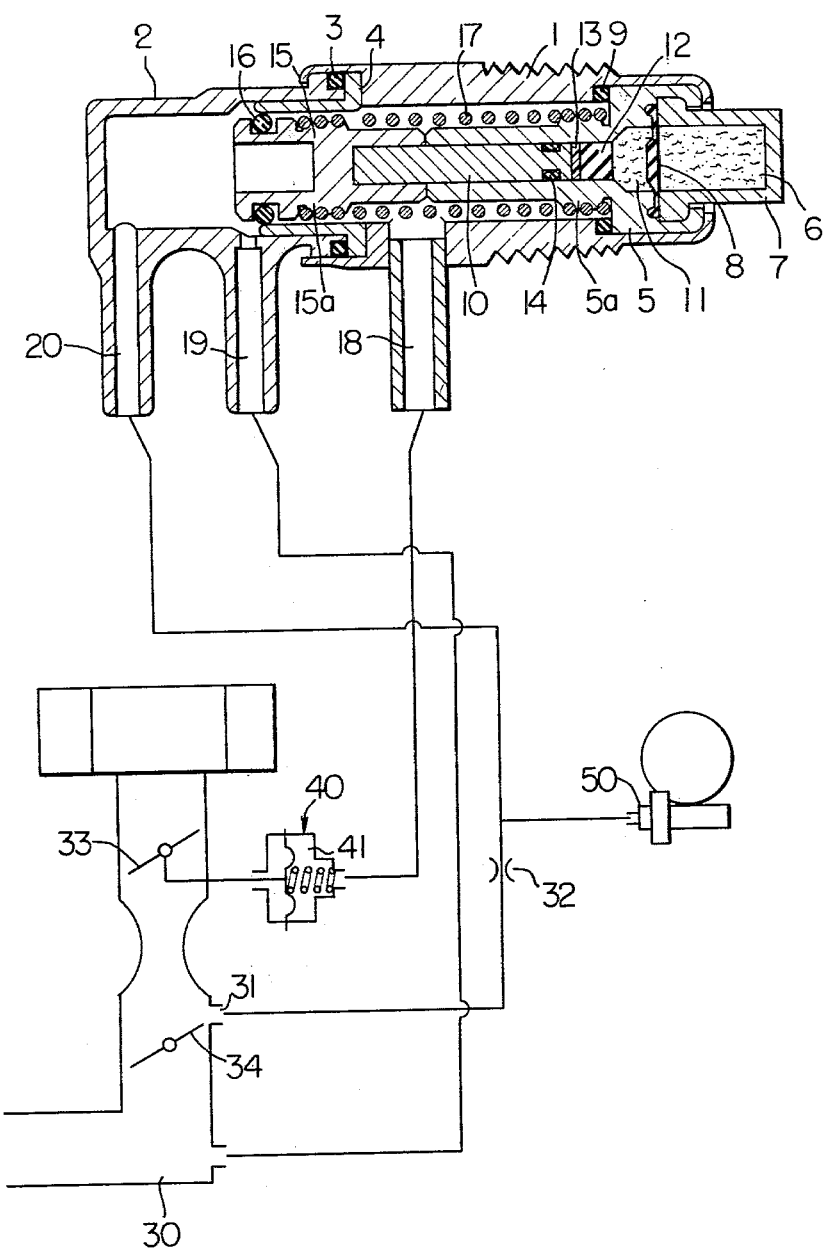
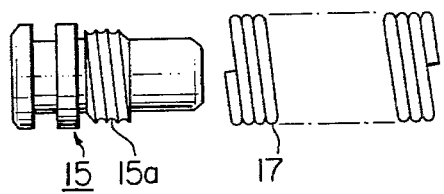
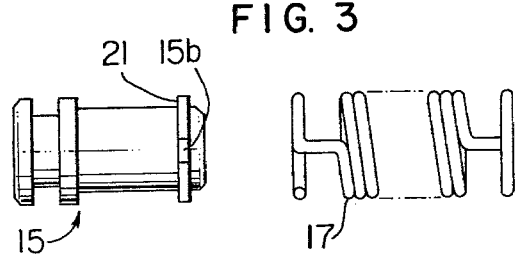

TEMPERATURE-DETECTION TYPE CHANGE-OVER VALVE

BACKGROUND OF THE INVENTION

The present invention relates to a temperature-detection type change-over valve adapted to effect a switching of communication between a plurality of passages, at a predetermined set temperature, making use of an expansion and shrinkage of a thermally expandable member.

The conventional temperature-detection type change-over valve has a drawback that it has a large axial length because the thermally expandable member, shaft and a valve member are arrayed in series in the axial direction.

SUMMARY OF THE INVENTION

It is, therefore, an object of the invention to provide a temperature-detection type change-over valve in which a tension spring disposed to surround the valve shaft for the compression spring normally used in a conventional valve, thereby to reduce the axial length of the change-over valve as a whole.

More specifically, according to the invention, there is provided a temperature-detection type changeover valve comprising: a thermally expandable member adapted to expand as its temperature rises, a shaft adapted to be pressed and moved in one direction by the expansion of the thermally expandable member; a valve member movable following up the movement of the shaft; and a tension spring disposed around the shaft and adapted to bias the valve member in the other direction.

The above and other objects, as well as advantageous features of the invention will become more clear from the following description of the preferred embodiments taken in conjunction with the accompanying drawings.

BRIEF DESCRIPTION OF THE DRAWINGS

FIG. 1 is a longitudinal sectional view of a temperature-detection type change-over valve embodying the present invention combined with a control device for an internal combustion engine;

FIG. 2 is a developed view of a valve member and a tension spring incorporated in the temperature-detection type change-over valve as shown in FIG. 1; and FIG. 3 is a developed view of an essential part of another embodiment of the invention.

DESCRIPTION OF THE PREFERRED EMBODIMENTS

Referring first to FIG. 1, a temperature-detection type change-over valve according to the invention has a first and second housing parts 1, 2 between which clamped is an "O" ring 3 for a sealing purpose. A cylindrical spacer 4 is disposed within the second housing part 2. A thermally expandable member 6 made of a thermo-wax or the like is confined within a chamber which is defined by a casing 7 and a diaphragm 8. The casing 7 and the diaphragm 8 are held by a guide 5 which is rolled on a shoulder portion of the casing 7. Similarly, the guide 5 is held by the first housing part 1 rolled thereon. A sealing member 9 is interposed between the first housing part 1 and the guide 5. A reference numeral 10 denotes a shaft which is adapted to move in accordance with the expansion of the thermally expandable member 6, while being guided by the guide 5.

Between the diaphragm 8 and the shaft 10, interposed are a semi-fluid substance 11 such as molybdenum disulfide, silicon grease, polyethylene or the like, a rubber piston 12 and a teflon sheet 13. Also, an "O" ring 14 is fitted around the shaft 10. Further, a valve member 15 is attached to the end of the shaft 10 more remote from the teflon sheet 13 than "O" ring 14. An "O" ring 16 is fits in an annular groove formed in the peripheral surface of the valve member 15. Also, a tension spring 17 disposed around the shaft 10 is retained at its one end by the valve member 15. More specifically, a screw-thread-like spring retainer 15a is formed around the valve member 15 so as to retain the tension spring 17.

Similarly, a spring retainer 5a, which also has a screw-thread-like form, is formed around the guide 5 so as to retain the other end of the tension spring 17. Thus, the tension spring 17 is stretched between the valve member 15 and the guide 5 so as to act against the expansion of the thermally-expandable member 6.

Reference numerals 18, 19 and 20 denote, respectively, a first passage, a second passage and a third passage.

In operation, when the temperature of a fluid which is the detection object is still below a predetermined set temperature, the valve 15 is pulled by the force of the spring 17 toward the guide 5, so that the "O" ring 16 attached to the valve member 15 is held in contact with the spacer 4, as shown in FIG. 1. Therefore, the passage 19 is allowed to communicate with the passage 20 but is disconnected from the passage 18. As the temperature of the fluid comes higher than the predetermined set temperature, the thermally expandable member 6 expands rapidly, so that it presses the valve member 15 to the left as viewed in the drawings, through the mediums of the diaphragm 8, semi-fluid substance 11, rubber piston 12 and the teflon seat 13, overcoming the tensile force of the spring 17. In consequence, the "O" ring 16 is moved into contact with the inner surface of the housing 2 beyond the passage 19, thereby to permit the passages 18 and 19 to communicate each other and to disconnect the passage 20 from the passage 19.

The temperature-detection type change-over valve of the invention can be used, for instance, in combination with a control device for controlling the operation of an internal combustion engine. A typical example of such an application is shown in FIG. 1. The case 7 confining the thermally-expandable member 6 is disposed in the passage of cooling water for cooling an internal combustion engine. The second passage 19 is connected to the intake passage 30 of the internal combustion engine, whereas the first passage 18 is communicated with a diaphragm chamber 41 of a choke opener 40. Also, the third passage 20 is in communication with a vacuum advancer 50 of the distributor attached to the engine. Further, a pipe for introducing the vacuum from the throttle port 31 of the carburetor is connected to an intermediate portion of a pipe connected between the third passage 20 and the vacuum advancer 50. The vacuum introduction pipe is provided at its intermediate portion with a restriction 32. Reference numerals 33 and 34 denote, respectively, a choke valve and a throttle valve.

In operation, while the cooling water temperature is still low as in the case of a cold start of the engine, the temperature-detection type change-over valve of the invention takes a state as shown in FIG. 1, so that the vacuum generated in the intake pipe 30 is transmitted to the vacuum advancer 50 to advance the ignition timing. If the throttle valve 34 is kept completely closed in this state, a pressure substantially equal to the atmospheric pressure is maintained at the area around the throttle port 31, but the vacuum introduction pipe has a restriction 32 at its intermediate portion for restricting atmospheric pressure. On the other hand, the choke opener 40 acts to keep the choke valve 33 in the closed state, because the diaphragm chamber 41 is kept away from any vacuum, i.e. under atmospheric pressure. Therefore, the engine operates at a larger ignition advance angle and smaller opening of the choke valve than in the ordinary cruising condition, for a smooth and stable warming up of the engine.

As the cooling water temperature reaches a predetermined set temperature several minutes after the start-up of the engine, the thermally expandable member 6 is expanded to switch the state of communication of the passages 18-20 the vacuum in intake pipe 30 is introduced to the diaphragm chamber 41 through the second passage 19 and first passage 18, thereby to dismiss the choked state of the intake passage.

Meanwhile, only the vacuum in the throttle port 31 of the carburetor is transmitted to the vacuum advancer 50, so that the ignition timing is controlled in accordance with the opening of the throttle valve 34.

FIG. 3 shows another form of retaining of the tension spring. A washer 21 is fitted in an annular groove 15b formed in the peripheral surface of the valve member 15. At the same time, the end of the spring 17 is shaped in the form of a ring, so as to be retained by the washer 21. The same construction may apply also to the guide 5 to retain the other end of the spring.

Although not shown, at least one end of the spring 17 may be shaped in the form of a hook so as to be suitably held by the valve member 15 or the guide 5.

As has been described, according to the invention, it is arranged such that the force generated by the expansion of the thermally expandable member acts against the force of a tension spring disposed to surround the shaft for transmitting the valve-actuating force to the valve member. In consequence, the space for accommodating the compression spring in the conventional valve is eliminated to permit the reduction of the size, as well as the production cost, of the temperature-detection type change-over valve.

What is claimed is:

1. A temperature responsive valve arrangement for controlling an internal combustion engine having a diaphragm-type choke opener, an intake pipe and a vacuum advance distributor comprising:

a thermally-expandable member adapted to expand as its temperature rises;

a shaft adapted to be pressed and moved in a first direction as the thermally expandable member expands, the thermally expandable member being disposed to sense a temperature representative of the state of the operation of the internal combustion engine;

a valve member rigidly coupled to the shaft and being movable between a first position where it permits a second fluid passage to communicate only with a third passage and a second position where it permits the second passage to communicate only with a first passage;

a tension spring disposed to surround the shaft and being adapted to bias the valve member in a second direction, opposite to the first direction such that when the representative temperature is above the predetermined temperature, the valve member is in the second position, the tension spring being retained at one end thereof by a screwthread like retainer formed around the valve member;

means for coupling the diaphragm of the choke opener to the first passage;

means for coupling the intake pipe to the second passage; and means for coupling the vacuum advancer of the distributor to the third passage, whereby whenever the representative temperature is below the predetermined temperature, the vacuum in the intake pipe is transmitted to the vacuum advancer through the second and third passages and whenever the representative temperature is above the predetermined temperature, the vacuum in said intake pipe is transmitted to the diaphragm of the choke opener through the second and first passages.

* * * * *